United States Patent
Campos et al.

(10) Patent No.: US 8,741,432 B1
(45) Date of Patent: Jun. 3, 2014

(54) FLUOROALKYLSILANATED MESOPOROUS METAL OXIDE PARTICLES AND METHODS OF PREPARATION THEREOF

(75) Inventors: Raymond Campos, Lancaster, CA (US); Timothy Haddad, Lancaster, CA (US); Joseph M. Mabry, Lancaster, CA (US); Andrew J. Guenthner, Lancaster, CA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 13/206,994

(22) Filed: Aug. 10, 2011

Related U.S. Application Data

(60) Provisional application No. 61/373,945, filed on Aug. 16, 2010.

(51) Int. Cl.
*B32B 5/16* (2006.01)
*B05D 7/00* (2006.01)
*B05D 3/02* (2006.01)

(52) U.S. Cl.
USPC ........ 428/403; 427/215; 427/220; 427/372.2; 427/384; 427/397.7; 428/405

(58) Field of Classification Search
CPC ...... C09C 1/3063; C09C 1/3081; C09C 1/309
USPC .............. 428/403–406; 427/215, 220, 372.2, 427/384, 397.7
See application file for complete search history.

(56) References Cited

U.S. PATENT DOCUMENTS

| | | | |
|---|---|---|---|
| 4,647,602 A | 3/1987 | Wilczak et al. |
| 4,997,684 A | 3/1991 | Franz et al. |
| 5,055,342 A | 10/1991 | Markovich et al. |
| 5,194,326 A | 3/1993 | Arthur et al. |

(Continued)

FOREIGN PATENT DOCUMENTS

EP 0719743 A1 * 7/1996

OTHER PUBLICATIONS

Yuri Kazakevich, Absorption Characterization of Oligo(dimethylsiloxane)-Modified Silicas: and Example of Highly Hydrophobic Surfaces with Non-aliphatic Architecture, American Chemical Society 2002, pp. 3117-3122.

(Continued)

*Primary Examiner* — Hoa (Holly) Le
(74) *Attorney, Agent, or Firm* — AFMCLO/JAZ; Rebecca Greendyke

(57) ABSTRACT

Coated particles comprise a core of fumed or precipitated inorganic metal oxide having a surface area of about 50 to about 500 square meters per gram and a shell consisting of an array of fluoroalkyl molecular chains at a density of at least 1 chain per square nanometer, joined to the core by covalent chemical bonds and with a total organic content of at least 9.9 percent by weight. These particles are formed by the chemical attachment of fluoroalkyl-alkylsilanes after exposure to an alkylamine and followed by an extraction to remove any organic material not covalently bound. The dense packing of molecular chains in the fluoroalkyl shell combined with a mesoporous structure imparts a very low surface energy, a very high specific surface area, and surface texture over a wide range of length scales. Such features are highly desirable for the creation of, for example, superhydrophobic and superoleophobic surfaces, separation media, and release films.

7 Claims, 2 Drawing Sheets

(56) References Cited

U.S. PATENT DOCUMENTS

| | | | |
|---|---|---|---|
| 5,328,768 | A | 7/1994 | Goodwin |
| 5,357,025 | A | 10/1994 | Altes et al. |
| 5,523,162 | A | 6/1996 | Franz et al. |
| 5,607,744 | A | 3/1997 | Diener et al. |
| 5,674,967 | A | 10/1997 | Goodwin |
| 5,688,864 | A | 11/1997 | Goodwin |
| 5,693,365 | A | 12/1997 | Teranishi et al. |
| 5,997,621 | A | 12/1999 | Scholz et al. |
| 6,020,026 | A * | 2/2000 | Birch et al. ............ 427/287 |
| 6,025,025 | A | 2/2000 | Bartug et al. |
| 6,159,540 | A * | 12/2000 | Menon et al. ............ 427/220 |
| 6,166,855 | A * | 12/2000 | Ikeyama et al. ............ 359/580 |
| 6,172,139 | B1 | 1/2001 | Swei et al. |
| 6,318,124 | B1 | 11/2001 | Rutherford et al. |
| 6,383,642 | B1 | 5/2002 | Le Bellac et al. |
| 6,589,639 | B2 | 7/2003 | Farquhar et al. |
| 6,811,884 | B2 | 11/2004 | Goodwin et al. |
| 6,865,939 | B2 | 3/2005 | Kirby |
| 7,013,965 | B2 | 3/2006 | Zhong et al. |
| 7,129,277 | B2 | 10/2006 | Baran, Jr. |
| 7,135,122 | B2 | 11/2006 | Park |
| 7,186,974 | B2 | 3/2007 | Tojo |
| 7,205,079 | B2 | 4/2007 | Wu et al. |
| 7,384,872 | B2 | 6/2008 | Hwang et al. |
| 7,455,911 | B2 | 11/2008 | Langen et al. |
| 7,514,494 | B2 | 4/2009 | Lechtenboehmer et al. |
| 7,527,870 | B2 | 5/2009 | Beger et al. |
| 8,216,674 | B2 * | 7/2012 | Simpson et al. ............ 428/403 |
| 2005/0069708 | A1 * | 3/2005 | Isarov et al. ............ 428/405 |
| 2005/0113488 | A1 * | 5/2005 | Isarov et al. ............ 523/212 |
| 2005/0123739 | A1 | 6/2005 | Chen-yang et al. |
| 2009/0176097 | A1 * | 7/2009 | Brown et al. ............ 428/403 |
| 2009/0214809 | A1 * | 8/2009 | Rohaut et al. ............ 428/34.7 |
| 2010/0233494 | A1 | 9/2010 | Moorlag et al. |
| 2011/0027709 | A1 | 2/2011 | Wu et al. |

OTHER PUBLICATIONS

Jan Genzer, Molecular Orientation and Grafting Density in Semifluorinated Self-Assembled Monolayers of Mono-, Di-and Trichloro Silanes of Silica Substrates, V Langmuir 2002, pp. 9307-9311.

Takash Monde, Adsorption Characteristics of Silica Gels Treated with Fluorinated Silylation Agents, Journal of Colloid and Interface Science 1997, pp. 111-118.

Alexander Fadeev, Self-Assembly is Not the Only Reaction Possible between Alkyltrichlorosilanes and Surfaces: Monomolecular and Oligomeric Covaltently Attached Layers of dichloro and Trichloroalkylsilanes on Silicon, American Chemical Society 2000, pp. 7268-7274.

Steele, A., et al., "Inherently Superoleophobic Nanocomposite Coatings by Spray Atomization," American Chemical Society, Dec. 10, 2008, pp. 501-505.

Sheen, Young-Ching, et al., "New Approach to Fabricate Extremely Super-amphiphobic Surface Based on Fluorinated Silica Nanoparticles," Journal of Polymer Science: Part B Polymer Physics, vol. 46, pp. 1984-1990, (2008).

Liu, Y., et al., "Silicon Surface Structure-Controlled Oleophobicity," Langmuir Article 2010 26(11 ), pp. 8908-8913.

Darmanin, T., et al., "Molecular Design of Conductive Polymers to Modulate Superoleophobic Properties," American Chemical Society 2009, pp. 7928-7933.

Tuteja, A., et al., "Designing Superoleophobic Surfaces," Science, 2007, 318, pp. 1618-1622.

Tuteja, A., et al., "Robust Omniphobic Surfaces," Proc. Natl. Acad. Sci. U. S. A., 2008, 105, pp. 18200-18205.

Tuteja, A., et al., "Design Parameters for Superhydrophobicity and Superoleophobicity," MRS Bull., 2008, 33, pp. 752-758.

Choi, W., et al., "Fabrics with Tunable Oleophobicity," Adv. Mater., 2009, 21, pp. 2190-2195.

Chhatre, S.S., et al., "Scale dependence of omniphobic mesh surfaces," Langmuir, 2010, 26, pp. 4027-4035.

Chhatre, S.S., et al., "Thermal Annealing Treatment to Achieve Switchable and Reversible Oleophobicity on Fabrics," Langmuir, 2009, 25, 13625.

Monde, T, et al., "Adsorption Characteristics of Silica Gels Treated with Fluorinated Silylation Agents", J. Colloid Interface Sci. 1997, 185, pp. 111-118.

Chhatre, S.S., et al., "Fluoroalkylated Silicon-Containing Surfaces-Estimation of Solid-Surface Energy," App Mat Int, vol. 2, No. 12, pp. 3544-3554 (2010).

Campos, R., et al., "Toward Mechanically-Robust Omniphobic Composite Coatings Using Fluoroalkyl-Modified Silica," Polymer Preprints, 2009, 50(2), pp. 717-718.

United States Patent and Trademark Office, Advisory Action, U.S. Appl. No. 13/207,562, mailed Aug. 7, 2013, 5 pages.

United States Patent and Trademark Office, Final Rejection, U.S. Appl. No. 13/207,562, mailed May 2, 2013, 6 pages.

United States Patent and Trademark Office, Non-Final Rejection, U.S. Appl. No. 13/207,562, mailed Oct. 24, 2012, 5 pages.

Duchet, J., et al., "Influence of the Deposition Process on the Structure of Grafted Alkylsilane Layers," Langmuir 1997, 13, 2271-2278.

Arkels, B., et al., "The Role of Polarity on the Substitution of Silanes Employed in Surface Modification," in Silanes and Other Coupling Agents vol. 5, K. Mittal Ed. p. 51 VSP (Brill) 2009, downloaded from <http://www.gelest.com/goods/pdf/Library/Roleofpolarity.pdf>.

* cited by examiner

FLUOROALKYLSILANATED MESOPOROUS METAL OXIDE PARTICLES AND METHODS OF PREPARATION THEREOF

CROSS REFERENCE TO RELATED APPLICATION

This application claims the benefit of U.S. provisional application Ser. No. 61/373,945 filed on Aug. 16, 2010.

STATEMENT OF GOVERNMENT INTEREST

The invention described herein may be manufactured and used by or for the Government for governmental purposes without the payment of any royalty thereon.

FIELD OF THE INVENTION

This invention relates to treated inorganic filler particles for fluorinated organic polymers and elastomers.

BACKGROUND OF THE INVENTION

Mesoporous inorganic filler particles consisting of aggregated primary particles having a very high hardness, such as fumed and precipitated silica, are widely employed in state-of-the-art elastomeric and polymeric compositions, as agents that impart especially high durability. In these compositions, the very small size of the primary particles allows for good optical transparency when the aggregates are sufficiently well-dispersed. On the other hand, particles that are not well-dispersed but remain as aggregates are useful as agents for creating desirable surface textures for improving adhesion or repelling liquids.

The small size of the primary particles also results in a large specific surface area. As a result, the surface characteristics of these particles are paramount in controlling the properties of polymeric and elastomeric formulations into which the particles are incorporated. The surfaces of inorganic particles immediately after production typically contain chemical functionalities that impart undesirable properties to polymeric and elastomeric formulations. Fumed and precipitated silica, for instance, feature surfaces with a high concentration of chemically bound silanol groups, in addition to large quantities of physisorbed and chemisorbed water and weakly bound organic impurities. For non-polar polymers and elastomers, and particularly for highly fluorinated polymers and elastomers, the high polarity of such surfaces greatly inhibits the establishment of intimate contact between the inorganic and polymeric or elastomeric components, leading to poor dispersion, mechanical weakness, poor flow properties, and a lack of readily reproducible physical characteristics.

To overcome these limitations, numerous techniques for modifying the surfaces of inorganic particles have been described. For fluorinated polymers and elastomers, a typical approach widely utilized in the prior art involves the treatment of silica particles with fluoroalkyl-alkylsilanes. In some instances, a small amount, generally less than 15 parts by weight of fluoroalkyl-alkylsilane per 100 parts by weight of silica, is added (see, for example, U.S. Pat. Nos. 4,647,602; 5,055,342; 7,514,494 and references therein). The silane becomes chemically attached to the silica, often through formation of a three-dimensional silicate network on the particle surface. These networks minimize the concentration of surface accessible silanols while binding fluoroalkyl functional groups to the silane surface, increasing the chemical compatibility of the filler with the fluoropolymer or fluoroelastomer. Although these methods produce inorganic particles that no longer inhibit intimate contact between the filler and the matrix, the limited amount of fluoroalkyl-alkylsilane employed, along with the disorganized nature of the three-dimensional network, results in a surface energy that is typically no lower than around 30 mJ per square meter, whereas for optimal repellency of fats, oils, and greases, a surface energy of 5-30 mJ per square meter is required.

In many cases, fluoroalkyl-alkylsilane treatment of idealized or carefully prepared surfaces of low specific surface area, such as silicon wafers or plate glass, or of high specific surface area, but having a non-discrete aggregated structure, such as a sol-gel, have been utilized (for examples, see U.S. Pat. Nos. 4,997,684; 5,328,768; 5,523,162; 5,674,967; 5,688, 684; 5,693,365; 5,997,621; 6,025,025; 6,811,884; 6,865,939; 7,186,964; 7,205,079; and 7,384,872). These coated objects, however, cannot be readily deposited on to other substrates by simple techniques such as spraying and thus cannot impart a nanoscale to microscale texture to surfaces not already patterned. In other cases, non-porous silica particles coated with fluoroalkyl-alkylsilanes have been utilized (for example, U.S. Pat. No. 5,607,744). In these cases, the lack of mesoporosity, as quantified by specific surface area, limits the range of textures that may be imparted to a surface. In particular, textures that are useful for liquid repellency against fluids at pressures beyond a few kPa require roughness at length scales below 100 nm.

In yet other cases, large quantities of fluoroalkyl-alkylsilane have been reportedly mixed with a wide variety of silica particles by non-specific methods, saturating the surfaces with both bound and unbound fluoroalkyl functionality (see, for example, U.S. Pat. Nos. 5,194,326 and 6,172,139) A more recent approach involves the dispersion of unbound fluorinated organic/inorganic hybrid molecules directly into polymers and elastomers. In such cases, the lack of covalent chemical bonding between the filler and the fluorinated surface treatment causes the treatment to disappear over time due to abrasion or leaching by fluids in contact with the fluorinated polymers or elastomers.

There exists, therefore, a need for a treated filler particle, having a well-defined monolayer-like arrangement of fluoroalkyl chains attached to its surface via covalent and thermally stable chemical bonds, such that the surface energy of the particle, for purposes of liquid repellency, is less than 30 mJ per square meter, and such that a formulation incorporating the particles can be coated onto a substrate, with the surface texture of the coating being controlled by conformality with the texture of the particle aggregates, so as to further impart desirable liquid repellence characteristics.

SUMMARY OF THE INVENTION

Broadly, the present invention provides a mesoporous aggregate comprised of solid particles, wherein at least some particles are attached to a brush-like coating comprised of an approximate monolayer of covalently bonded fluoroalkyl-alkyl fragments, and wherein the aggregates may be dispersed in a formulation containing a fluoropolymer or fluoroelastomer that can be applied to a substrate and impart a surface texture combining a low surface energy with a well-defined texture extending from nanometer to micrometer length scales.

DETAILED DESCRIPTION OF THE INVENTION

Figure 1A:
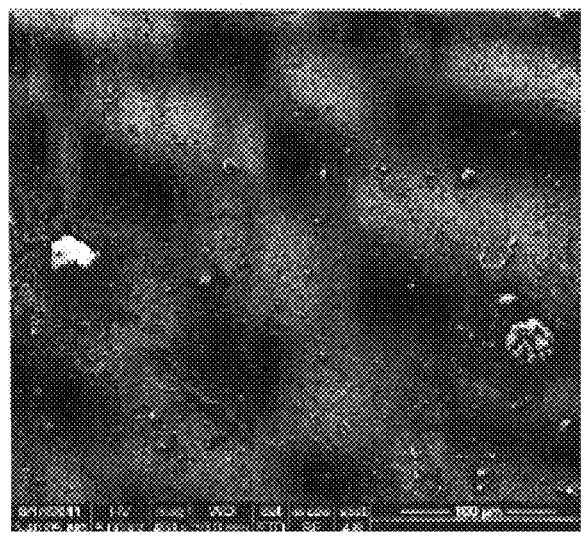
FIGS. 1a, 1b, and 1c are scanning electron microscope (SEM) images of an exemplary superhydrophobic coating taken at three different magnifications.

The treated aggregate of the present invention, comprises:

a) an inorganic oxide substrate having the formula $SiO_x$, wherein the substrate possesses a specific surface area of at least 50 square meters per gram, with at least 1 surface hydroxyl group per square nanometer prior to treatment;

b) a brush-like molecular layer coating of —$CF_3$ terminated molecular fragments covalently bonded to the substrate, such that at least 15 parts by weight of the element F, in the form of —CF—, $CF_2$—, or —$CF_3$ fragments, is covalently bound to 100 parts by weight of the untreated aggregate; and c) a geometric shape, as determined by the arrangement of the particles comprising the aggregate, that is characterized by the occurrence of concave features of multiple sizes spanning a range from 5 nm to at least 0.001 mm, with the maximum distance between any two points in the aggregate not exceeding 0.02 mm.

In a preferred embodiment, the substrate is Hi-Sil 233 precipitated silica, and the brush-like molecular coating consists of —$Si(CH_3)_mCH_2CH_2$—$(CF_2)_nCF_3$, in which m=1 or 2 and n=5 or 7.

The present invention also relates to a method of producing the treated aggregate comprising:

a) removing all physically adsorbed water from an inorganic silicon oxide with a specific surface area of at least 50 square meters per gram while leaving intact at least one surface hydroxyl group per square nanometer;

b) exposing the dried silicon oxide to an otherwise inert atmosphere containing a sufficient concentration of alkylamine vapor for a sufficient time to cause adsorption onto the silicon oxide surface, preferably at least 24 hours;

c) dispersing the particles in a moisture-free carrier solvent having a neutral to acidic pH:

d) introducing at least a four-fold molar excess of a fluorinated chlorosilane coupling agent and stirring for 0.1-100 hours, preferably at least 72 hours;

e) removing the carrier solvent and excess reagents by centrifugation;

f) removing substantially all of the non-covalently bonded material by continuous extraction in a good solvent for fluoroalkyl-silanes with a neutral to acidic pH for 1-1000 hours; and g) drying of the initial product to remove all traces of the extraction solvent.

In a preferred embodiment, the primary particles are about 7 nm in diameter and composed of silica formed by condensation from vapor ("fumed silica") with surfaces containing 4-5 silanol groups per square nanometer. The particles are aggregated in a hierarchical fashion, with a polydispersity of aggregate sizes, with the majority of aggregates spanning no more than 20 micrometers in any direction. The limited overall dimensions of the aggregates are essential for compatibility for simple coating processes. The specific surface area is 390 square meters per gram.

In another preferred embodiment, the primary particles are 22 nm in diameter and composed of silica formed by precipitation from an aqueous medium ("precipitated silica"). The surfaces of these particles contain from 5 to 12 silanol groups per square nanometer. The particles are aggregated in a hierarchical fashion, with the majority of aggregates spanning no more than 20 microns in any direction. The specific surface area is 120 square meters per gram.

In preferred embodiments, the aggregates are dried under vacuum sufficiently to remove all physisorbed water from their surface. The procedures for drying will be apparent to one skilled in the art and vary according to the quantities dried in one batch; a typical drying procedure for 2 grams of silica involves maintaining a pressure of no more than 0.001 atm at a temperature of 200° C. for 16 hours. Great care must be taken to avoid exposing the aggregates to any source of water once the removal process is accomplished. Precautions include using column chromatography to remove all traces of water from any solvents employed subsequent to water removal. Note that in contrast to methods for preparing flat surfaces such as silicon wafers for treatment, no etching procedures are used, since etching was severely alter if not destroy entirely the primary particles of the aggregate.

In a most preferred embodiment, the dried silica aggregates are transferred to a container containing dimethylamine gas at 1 atm pressure and allowed to equilibrate. The silica aggregates are then suspended in chloroform that is free of moisture.

In a most preferred embodiment, 1,1,2,2-tetrahydrodecyl)-dimethylchlorosilane ("FDec-MCS"), as obtained from the manufacturer, is introduced to the suspension in a four-fold molar excess compared to silanol, based on the previously determined specific surface area and silanol density of the aggregates. The suspension is then stirred for 72 hours in an inert atmosphere.

In preferred embodiments, the removal of all non-covalently bound species is accomplished by filtration and centrifugation of the aggregates, followed by extraction in a Soxhlet apparatus in dry chloroform, followed by collection and drying. The procedures for the centrifugation, extraction, and drying vary with the size of the aggregate batches being processed, and are able to be determined by one skilled in the art. A typical procedure for 2 gram batches of aggregates involves centrifugation for 60 minutes, extraction for 72 hours, and drying at 100° C. for 24 hours under no more than 0.001 atm of inert gas. In other embodiments, a silane having a shorter fluoroalkyl-alkyl chain length than FDec-MCS is used in place of at least some of the FDec-MCS. An example of such a silane is (tridecafluoro-1,1,2,2-tetrahydrooctyl) dimethylchlorosilane ("FOct-MCS"). In yet other embodiments, 1, heptadecafluoro-1,1,2,2-tetrahydrodecyl)methyldichlorosilane (fluorodecyl dichlorosilane or FDec-DCS) is used to replace at least some of the FDec-MCS. The fluoroalkyl-alkyl silane selected, however, must contain a sufficient number of —$CF_2$— and —$CF_3$ fragments near its non-bonded terminus to ensure that substances in contact with the treated aggregates encounter a surface with sufficiently low energy. As apparent to one skilled in the art, mixtures of silanes meeting the just mentioned compositional requirements may also be used in place of the FDec-MCS.

The following examples provide an explanation of the necessary features of the embodiments.

EXAMPLE 1

Among silane coupling agents multiple chemical forms are known, including mono-, di-, and tri-chlorosilanes as well as mono-, di-, and tri-alkoxysilanes. It is widely understood that alkoxysilanes must be hydrolyzed (often in-situ) in order to become properly activated for attachment to silica surfaces. It is also understood that the attachment reaction generates water as a by-product. Since the invention involves methods that are effective only when the concentration of water is minimized (as apparent to one skilled in the art), the surface treatment agent was selected only from among the chlorosilanes. The prior art has shown that the choice of chlorosilane will impact the final properties of the treated surface (Monde, T.; Nakayama, N.; Yano, K.; Yoko, T.; Konakahara, T. J. Colloid Interface Sci. 1997, 185, 111-118; Fadeev, A. Y.; McCarthy, T. J. Langmuir 2000, 16, 7268-7274; Genzer, J.; Efimenko, K.; Fischer, D. A. Langmuir 2002, 18, 9307-9311), however, based only on the prior art the impact of the choice of chlorosilane, particularly as it relates to the need for minimal surface energy, is not obvious. In particular, whereas silanes of higher functionality may attach fluorine-containing chemical functionality at a higher concentration, they may reduce the homogeneity of the modified surface layer, and the relative importance of these factors in controlling the contact angle dynamics on highly textured surfaces in fluoroelastomer composites, for instance, has not been quantitatively determined.

To determine the best choice of chlorosilane, precipitated silica (Hi-Sil®233, 22 nm diameter, 135 m2/g surface area) was purchased from PPG Industries. Fluorinated silane reagents: (heptadecafluoro-1,1,2,2-tetrahydrodecyl)dimethylchlorosilane (fluorodecyl monochlorosilane or FDec-MCS); (heptadecafluoro-1,1,2,2-tetrahydrodecyl)methyldichlorosilane (fluorodecyl dichlorosilane or FDec-DCS); and (heptadecafluoro-1,1,2,2-tetrahydrodecyl)trichlorosilane (fluorodecyl trichlorosilane or FDec-TCS) were purchased from Gelest™, Inc Anhydrous dimethylamine was purchased from Aldrich®. The preceding materials were all used as received from the manufacturer. Reagent grade chloroform was purchased from Aldrich® and passed through an activated alumina column prior to use.

The surface functionalization of silica particles was performed using Schlenk line techniques, taking great care to minimize moisture exposure. Silica particles (2 g), in a 250 mL round-bottom flask, were initially dried by heating overnight at 200° C. under dynamic vacuum. The dried silica was allowed to cool to room temperature under vacuum, then stirred under one atmosphere of dimethylamine for 17 hours. The silica particles were then suspended in 80 mL of dry chloroform. A four-fold excess of fluoroalkyl-substituted chlorosilane reagent (e.g. 7.00 grams FDec-MCS), assuming a maximum grafting density of 4 μmol per square meter was then added via syringe. The reaction mixture was allowed to stir for three days in a dry nitrogen environment before the fluoroalkyl-functionalized silica particles were recovered by centrifuge and purified by exhaustive Soxhlet extraction in chloroform. The extraction was allowed to proceed for three days in a nitrogen environment to ensure the removal of any non-covalently bound chlorosilane-derived species or other surface contaminants. After the extraction process, the particles were dried in a stream of nitrogen, transferred to vials, and dried at 100° C. under dynamic vacuum for approximately one hour. A typical yield was 2.0-2.5 grams of modified silica.

Fluorine elemental analyses were performed by Atlantic Microlab Inc. Nitrogen adsorption-desorption isotherm experiments were conducted at 77 K using a Micromeritics® ASAP® 2020 Accelerated Surface Area and Porosimetry system. Samples were initially degassed at 110° C. for 8 hours under dynamic vacuum. Surface areas were calculated using Brunauer-Emmet-Teller (BET) equation analysis using a nitrogen cross-sectional area of 16.2 square Angstroms. Water uptake of functionalized silica particles was determined by exposing particles to 25° C./90% R.H. in a Tenney® ETCU series environmental chamber for 24 hours, then measuring the weight loss due to water evaporation/desorption using thermogravimetric analysis (TA Instruments® Q5000 IR TGA system). The "wet" samples were heated in a nitrogen environment from room temperature to 100° C. at 10° C./min, held isothermally for 1 hour, and then ramped to 1000° C. at 10° C./min. Weight loss from room temperature to 100° C. was used for water uptake values, while the weight loss up to 1000° C. was used to determine the thermal stability of the grafted layer and to estimate the graft density. The approximate errors in the measurement techniques were 0.5 wt % for fluorine elemental analysis, 0.5 wt % for thermogravimetric analyses, 1 square meter per gram for BET surface area, 1 (dimensionless) for the BET C constant, and 0.2% for water uptake.

As is evident from Table 1, the choice of chlorosilane did have a significant impact on the performance of the invention. The BET C constant has been recognized as being a good proxy for surface energy, with a roughly linear relationship in which the surface energy in mJ per square meter is equal to the C constant value plus approximately 5, based on measurements of fluorinated compounds with a known surface energy, and in agreement with previously reported work on silicone-treated silica particles (Kazakevich, Y. V.; Fadeev, A. Y. Langmuir 2002, 18, 3117-3122). The BET C constant was lowest, by a significant amount, for the FDec-MCS. The FDec-MCS also provided the greatest amount of attached fluorine, which was present in the form of the needed $-CF_2-$ and $-CF_3$ molecular fragments, and the least amount of water uptake, thereby allowing the best compatibility with fluoropolymers or fluoroelastomers The BET data also indicated that the particles retained their high specific surface area, thus they retained a complex geometry with roughness at multiple length scales (as confirmed by SEM observation), allowing them to impart a complex nanoscale to microscale texture when included in coating formulations.

TABLE 1

Effect of Chlorosilane Choice on Key Properties of Treated Silica Particles

| Sample | Wt. % F | % Wt. Loss (23-200° C.) | % Wt. Loss (200-1000° C) | BET Surface Area (m²/g) | BET C Constant | Water Uptake (wt. %) |
|---|---|---|---|---|---|---|
| Prec-Blank | 0.4 | 4.8 | 5.0 | 123 | 127 | 3.7 |
| Prec-FDec-TCS | 6.6 | 4.3 | 16.1 | 128 | 30 | 3.2 |
| Prec-FDec-DCS | 9.0 | 3.5 | 21.2 | 94 | 23 | 3.0 |
| Prec-FDec-MCS | 9.9 | 3.8 | 20.1 | 92 | 21 | 2.8 |

EXAMPLE 2

In addition to silane head-group functionality, another choice in selecting the appropriate surface treatment was the length of the silane tail group. As mentioned previously, the treated aggregates must possess enough $-CF_2-$ and $-CF_3$ molecular fragments to provide good compatibility with fluoropolymers or fluoroelastomers. However, if the size of the silane molecule used in the surface treatment was too large, the geometrical constraints inherent in mesoporous silica may have prevented a high density of grafting, making the choice not obvious based on the prior art. To determine the proper tail length, the same techniques for analysis described in Example 1 were utilized, however, the silanes used were (heptadecafluoro-1,1,2,2-tetrahydrodecyl)dimethylchlorosilane (fluorodecyl monochlorosilane or FDec-MCS); (tridecafluoro-1,1,2,2-tetrahydrooctyl)dimethylchlorosilane (FOct-MCS); and (3,3,3-trifluoropropyl)dimethylchlorosilane (FPro-MCS). In addition, fumed silica (7 nm diameter, 390±40 m2/g surface area), as purchased from Sigma-Aldrich®, was treated in separate batches along with the precipitated silica described in Example 1.

According to Table 2, the FDec-MCS provided the highest level of fluorine, and the least water uptake (though in fumed silica, the water uptake was not significantly different for FDec-MCS and FOct-MCS), maximizing compatibility with fluoropolymers and fluoroelastomers. FDec-MCS also provided the lowest BET C constant by a significant margin for precipitated silica, while providing the lowest BET C constant, though not significantly different from FOct-MCS, for fumed silica. These results indicated that FDec-MCS provided the lowest surface energy (as explained in Example 1). Despite their large size, the longer tails resulted in only a modest decrease in BET surface area, indicating that the treated aggregates retained a complex nanoscale to microscale texture and thus the ability to impart said texture to surfaces formed by facile methods of coating substrates. Although fumed silica provided slightly higher BET C constants (in a dry state) than precipitated silica, fumed silica resulted in much lower water uptake, thus in the presence of moisture, fumed silica would be expected to retain its low surface energy to a much greater extent.

TABLE 2

Effect of Chlorosilane Tail Length on Key Properties of Treated Silica Particles

| Sample | Wt. % F | % Wt. Loss (23-200° C.) | % Wt. Loss (200-1000° C) | BET Surface Area (m$^2$/g) | BET C Constant | Water Uptake (wt. %) |
| --- | --- | --- | --- | --- | --- | --- |
| Prec-Blank | 0.4 | 4.8 | 5.0 | 123 | 127 | 3.7 |
| Prec-FPro-MCS | 2.1 | 4.4 | 8.2 | 106 | 29 | 3.4 |
| Prec-FOct-MCS | 7.4 | 4.3 | 16.2 | 101 | 24 | 3.4 |
| Prec-FDec-MCS | 9.9 | 3.8 | 20.1 | 92 | 21 | 2.8 |
| Fum-Blank | 0.0 | 3.9 | 2.6 | 250 | 111 | 2.9 |
| Fum-FPro-MCS | 4.7 | 1.5 | 9.4 | 256 | 29 | 0.7 |
| Fum-FOct-MCS | 13.4 | 1.0 | 21.3 | 187 | 26 | 0.4 |
| Fum-FDec-MCS | 17.5 | 1.6 | 26.9 | 184 | 25 | 0.6 |

EXAMPLE 3

In order to demonstrate that the invention allowed for the creation of coating formulations with a fluoroelastomer which subsequently imparted a complex surface texture and outstanding liquid repellence characteristics to a substrate via a simple coating process, elastomeric composites were produced by dispersing 5 mg/mL of a blend consisting of 50 wt % functionalized fumed silica particles (treated with FDec-MCS as described in Examples 1 and 2) and 50 wt % Viton® Extreme™ ETP-600S fluoroelastomer (a copolymer of ethylene, tetrafluoroethylene, perfluoro(methylvinyl)ether, and bromotetrafluorobutene obtained from DuPont™) into a 5 mg/mL solution of 1,3-dichloro-1,2,2,3,3-pentafluoropropane (AK-225G) solvent. The mixture was then spin-coated onto silicon wafers at 900 rpm for 30 seconds. Dynamic contact angles for the coatings were measured using a DataPhysics Instruments OCA20 goniometer equipped with a TBU90 tilting stage. Deionized water that was further purified using a Millipore® system was used as a probing liquid for contact angle measurements. Advancing contact angles were measured by dispensing a 4 μL droplet onto a test substrate, then slowly adding water to the droplet through a syringe needle at a rate of 0.2 μL/sec until the droplet advanced on the substrate past 5 μL. This was immediately followed by removing liquid at the same rate until the droplet receded in order to measure the receding contact angle value. The advancing and receding contact angles were measured with an elliptical fit using DataPhysics Instruments droplet fitting software. Three to five experiments were conducted on different areas of each sample with contact angles typically varying by ±2.5°. Roll-off angles were measured by placing a 10 μL, droplet onto the test substrate and then slowly tilting the base unit.

Figure 1B:
Figure 1C:
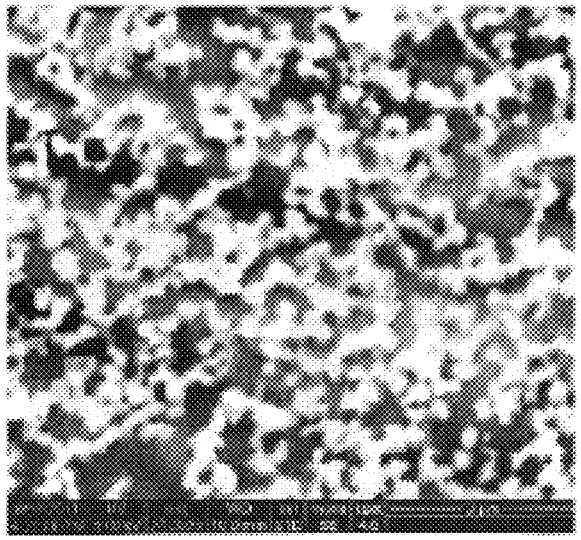

The advancing contact angle of the coating was, on average 160.5 degrees with a standard deviation of 3.5 degrees, while the receding angle was, on average, 160.0 degrees with a standard deviation of 3.4 degrees. These very high contact angles with a minimal difference between the average advancing and receding angles are characteristic of superhydrophobicity, a technologically important liquid repellence phenomenon that generally requires both a specific range of surface energy and a specific surface texture to realize in practice. SEM micrographs of this superhydrophobic coating containing the treated fumed silica at magnifications of 400× (FIG. 1a), 12,000× (FIG. 1b), and 24,000× (FIG. 1c) revealed a surface with regularly dispersed sub-micron features that appear to range from 50-500 nm with occasional aggregates ranging from 2-10 microns. Atomic force microscopy analysis provided additional evidence that the majority of the surface consisted of tightly packed sub-micron features.

EXAMPLE 4

Figure 2:
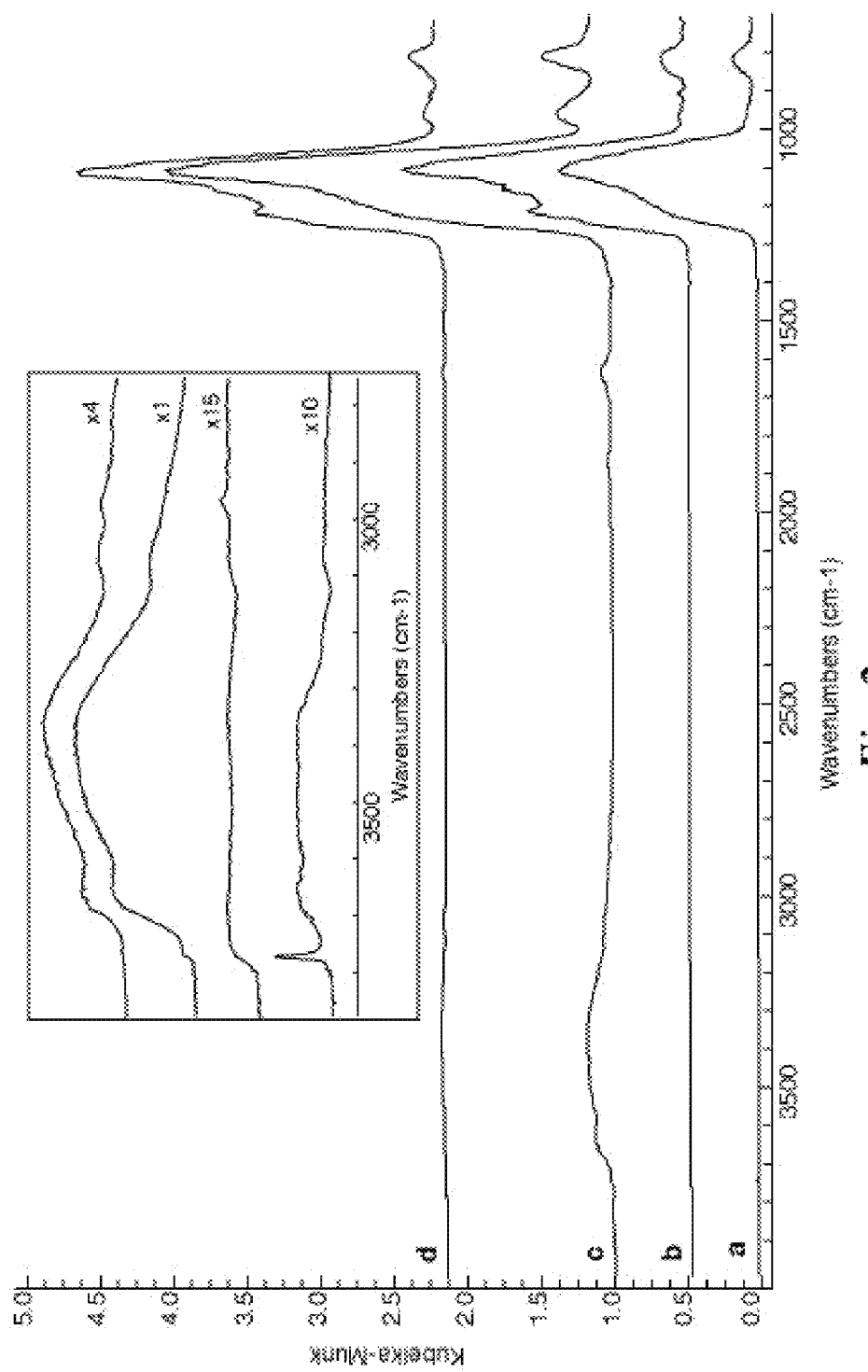
FIG. 2 is a Fourier transform-infrared (FT-IR) of untreated and treated aggregates.

An important distinguishing characteristic of the invention is the covalent chemical attachment of a large majority of the fluorinated chemical fragments to the silica surface. The covalent attachment prevents the slow washing away of the beneficial chemical functionality on periods of extended contact with liquids. To demonstrate covalent bonding, the Diffuse Reflectance Infrared Fourier Transform (DRIFT) spectra of untreated, "as received," silica and FDec-MCS treated silica samples are shown in FIG. 2. FIG. 2 shows FT-IR of untreated and treated aggregates: a) untreated fumed silica, b) fumed silica treated with FDec-MCS, c) untreated precipitated silica, and d) precipitated silica treated with FDec-MCS. The strong narrow band at 3747 cm$^{-1}$ in the spectrum for "as received" fumed silica (a) was indicative of isolated silanols on the outer silica surface. This narrow band was significantly weaker in the precipitated silica spectrum (c), consistent with a heavily hydroxylated silica surface with a large population of vicinal and geminal silanols. Broad overlapping peaks from 3000-3700 cm$^{-1}$ were attributed to these silanol types, both interior and on the surface, as well as surface adsorbed water. Once silanols were substituted with fluoroalkyl substituents, the isolated silanol band was almost completely absent from spectra for both surface types, indicative of covalent attachment. The formation of siloxane bonds, indicated by the spectral features from 1100-1250 cm$^{-1}$, as well as fine stretches in the fingerprint region, also suggested covalent attachment.

What is claimed is:
1. A treated aggregate, comprising:
   a) an inorganic oxide substrate having the formula SiO$_x$, wherein the inorganic oxide substrate possesses a specific surface area of at least 50 square meters per gram;
   b) a molecular layer coating of —CF$_3$ terminated molecular fragments, wherein the —CF$_3$ terminated molecular fragments are covalently bonded to the inorganic oxide substrate such that at least 15 parts by weight of fluorine in the form of —CF—, —CF$_2$—, or —CF$_3$ fragments is covalently bound to 100 parts by weight of the inorganic oxide substrate, wherein the treated aggregate comprises a geometric shape that is determined by the inorganic oxide substrate and the molecular layer coating, the geometric shape being characterized by an occurrence of concave features of multiple sizes spanning a range from about 5 nm to about 0.001 mm.

2. The treated aggregate of claim 1, wherein the inorganic oxide substrate is fumed silica with an average particle diameter of about 7 nm, and wherein the molecular layer coating consists of —Si(CH$_3$)$_2$CH$_2$CH$_2$—(CF$_2$)$_7$CF$_3$.

3. The treated aggregate of claim 1, wherein the inorganic oxide substrate is precipitated silica, and wherein the molecular layer coating consists of —Si(CH$_3$)$_m$CH$_2$CH$_2$—(CF$_2$)$_n$CF$_3$, wherein m=1 or 2 and n=5 or 7.

4. The treated aggregate of claim 1, wherein the treated aggregate comprises a surface energy of less than 30 mJ per square meter.

5. A method of producing the treated aggregate of claim 1, comprising:

a) removing a plurality of physically adsorbed water from an inorganic silicon oxide with a specific surface area of at least 50 square meters per gram while leaving intact at least one surface hydroxyl group per square nanometer;

b) exposing the inorganic silicon oxide to an atmosphere containing a concentration of alkylamine vapor for a time to cause adsorption onto a plurality of the specific surface area;

c) dispersing the inorganic silicon oxide in a moisture-free carrier solvent having a neutral to acidic pH;

d) introducing at least a four-fold molar excess of a fluorinated chlorosilane coupling agent and stirring for 0.1-100 hours, whereby a portion of the fluorinated chlorosilane coupling agent is covalently bound to the inorganic silicon oxide;

e) removing the moisture-free carrier solvent and excess reagents by centrifugation;

f) removing substantially all non-covalently bound fluorinated chlorosilane coupling agent by continuous extraction in an extraction solvent with a neutral to acidic pH for 1-1000 hours to form a treated aggregate; and g) drying the treated aggregate to remove the extraction solvent.

6. The method of claim 5, wherein the fluorinated chlorosilane coupling agent is selected from the group consisting of: heptadecafluoro-1,1,2,2-tetrahydrodecyl)dimethylchlorosilane, tridecafluoro-1,2,2,2-tetrahydrooctyl)dimethylchlorosilane, heptadecafluoro-1,1,2,2-tetrahydrodecyl)methyldichlorosilane, and mixtures thereof.

7. The method of claim 5, wherein the alkylamine vapor is dimethylamine.

* * * * *